July 12, 1938. H. F. SMITH 2,123,478
LIGHT REFLECTING DEVICE
Filed March 10, 1936
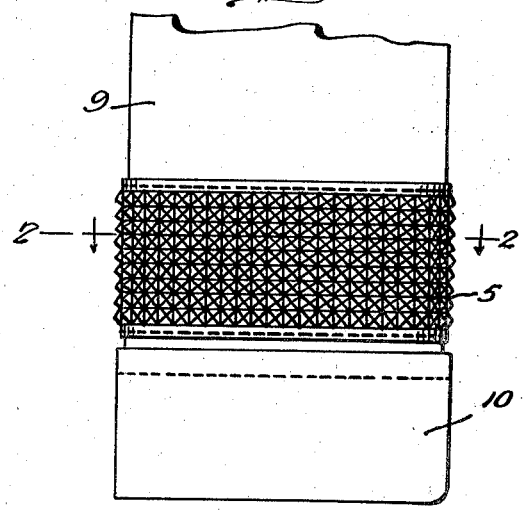
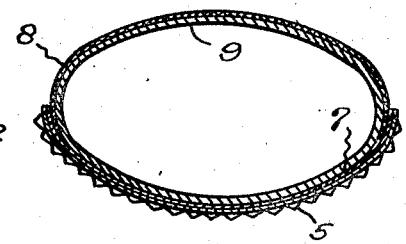
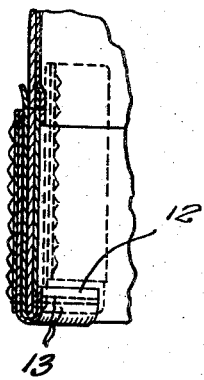
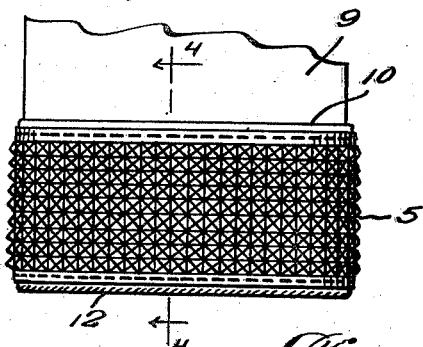
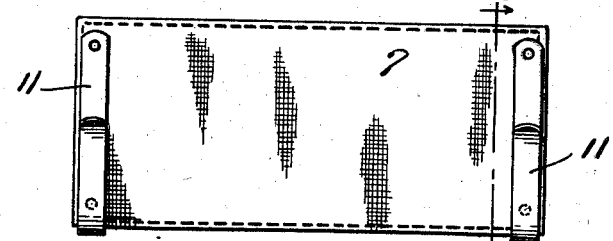
Inventor
Hobart F. Smith
By J. Stanley Burch
Attorney Patented July 12, 1938

2,123,478

UNITED STATES PATENT OFFICE 2,123,478

LIGHT REFLECTING DEVICE

Hobart Frederick Smith, Los Angeles, Calif.

Application March 10, 1936, Serial No. 68,095

1 Claim. (Cl. 88—30)

This invention relates to a novel and useful light reflecting device adapted to be worn on the coat sleeve of a pedestrian or automobile driver so as to reflect the light from the headlights of an approaching automobile to warn the driver of the latter of the presence of the pedestrian, or to reflect the light from the headlights of a following automobile so that the driver of the latter may readily discern and identify the various motion and direction signals given by the hand of the automobile driver wearing the present device.

The primary object of the present invention, therefore, is to provide a light reflecting device adapted to be worn by pedestrians or automobile drivers to promote their safety and safe driving at night time.

A more specific object of the present invention, is to provide a safety light reflecting device of the above kind adapted to be readily applied to and worn on the coat sleeve of a pedestrian or automobile driver at or adjacent the cuff of said sleeve, and embodying a light reflecting element of strip-like form and of a length to extend substantially or at least half way around the coat sleeve so as to be illuminated by light rays striking the same from the front, rear or side.

A still more specific object of the present invention is to provide a light reflecting device of the above kind including means for securing the light reflecting element on a coat sleeve so that said element may be readily removed from sight when not required for use.

Still another object of the present invention is to provide a light reflecting device of the above character which is extremely simple in construction and economical to manufacture, efficient in use, and easy to apply to a coat sleeve.

Other objects and features of the present invention will become apparent from the following description when considered in connection with the accompanying drawing, in which:

Figure 1 is a fragmentary elevational view of a coat sleeve provided with a light reflecting device embodying the present invention.

Figure 2 is a transverse section on line 2—2 of Figure 1.

Figure 3 is a view somewhat similar to Figure 1 of a modified form of the invention.

Figure 4 is a longitudinal section on line 4—4 of Figure 3.

Figure 5 is an inside elevational view of a still further form of light reflecting device embodying the present invention.

Figure 6 is a section on line 6—6 of Figure 5; and

Figure 7 is a fragmentary section through the light reflecting element as constructed in all forms of the invention, the device being drawn on an enlarged scale to more clearly illustrate the construction.

Generally stated, the present invention includes a light reflecting element in the form of a flexible strip-like member adapted to be applied to the sleeve of a coat at or adjacent the cuff of the sleeve, and being of a length to extend substantially or at least half way around the coat sleeve for reflecting light rays striking the same at various angles from the front, rear, or outer side. This light reflecting element consists essentially of a translucent or transparent light transmitting flexible strip of material such as colored celluloid. This strip is indicated at 5 and is provided on its rear surface with a suitable light reflecting material 6, such as a coating of bronze paint. Also, the strip 5 is preferably embossed to provide substantially throughout its entire area a series of similar small prismatic portions arranged in transverse and longitudinal rows so as to not interfere with the longitudinal flexing of the strip. By providing these prismatic portions, the reflecting element will reflect light striking the same from practically every angle, as is generally well known in the art. If desired, the light reflecting element may be carried by or stitched to a cloth backing sheet 7 of similar form and size.

Associated with the light reflecting element above described, is a means for attaching said light reflecting element to the sleeve of a coat so that such element may be readily removed from sight when not required for use. For this purpose, the light reflecting element may be applied to the coat sleeve so as to be completely removable therefrom. Securing means suitable for this manner of use may consist of an elastic strap 8 stitched at its ends to the ends of the light reflecting element or its cloth backing 7 as shown in Figure 2. With this arrangement, the light reflecting element and the strap 8 combine to form a band adapted to snugly and completely encircle the coat sleeve 9 at or adjacent the cuff 10.

The device may also be applied directly on the cuff of the coat sleeve so as to be removable therefrom, in which case suitable spring clips 11 may be attached to the back of the reflecting element at the ends of the latter for engagement with the cuff of the coat sleeve so that the reflecting element will be conformed with the cuff and held thereon in an obvious manner.

Another method of attachment may consist in providing the light reflecting element with a projecting flexible tab 12 along one longitudinal edge adapted to be stitched to the inside of the cuff of a coat sleeve adjacent the lower edge of the cuff as at 13 in Figure 4. This arrangement permits the light reflecting element to be placed outside the cuff as shown by full lines in Figures 3 and 4 or inside the cuff where it is removed from sight, as indicated by dotted lines in Figure 4. In either case, the light reflecting element will remain in its adjusted position due to the attachment of the tab 12 and the curvature of the cuff of the coat sleeve and the reflecting device at this point. This form of the invention also provides for removal of the reflecting element from sight although not permitting detachment thereof from the coat sleeve. The tab 12 may consist of an integral extension on the cloth backing 7, which backing is preferably used to afford a measure of protection for the coat sleeve and to provide durable means of attachment for the strap 8, clasps 11 or tab 12.

With the device applied to a coat sleeve as illustrated, it will be readily seen that light from the head-lights of approaching automobiles will be effectively reflected so as to promote safety, either by warning the driver of an automobile of the presence of a pedestrian wearing the device, or by enabling the driver of an automobile to readily discern and identify signals executed by a wearer of the device when driving another automobile.

While I have shown and described certain specific embodiments and details, it will be apparent that the invention is susceptible of various changes and modifications such as fairly fall within the scope of the invention as claimed.

What I claim as new is:

The combination with a coat sleeve, of a light reflecting signalling device comprising a lustrous flexible strip-like light reflecting element conforming to and extending at least half way around said coat sleeve, and means securing said light reflecting element on the coat sleeve so that said light reflecting element is readily removable from sight, said last-named means including a flexible tab carried by the light reflecting element along one longitudinal edge of the latter and stitched to the inside of the coat sleeve adjacent and along the lower edge of said sleeve, whereby the light reflecting element may be disposed at the outside or at the inside of the sleeve.

HOBART FREDERICK SMITH.